US009703763B1

(12) United States Patent
Zemach

(10) Patent No.: US 9,703,763 B1
(45) Date of Patent: Jul. 11, 2017

(54) AUTOMATIC DOCUMENT CITATIONS BY UTILIZING COPIED CONTENT FOR CANDIDATE SOURCES

(71) Applicant: Google Inc., Mountain View, CA (US)

(72) Inventor: Aaron Saul Zemach, Deerfield, IL (US)

(73) Assignee: GOOGLE INC., Mountain View, CA (US)

( * ) Notice: Subject to any disclaimer, the term of this patent is extended or adjusted under 35 U.S.C. 154(b) by 174 days.

(21) Appl. No.: 14/459,769

(22) Filed: Aug. 14, 2014

(51) Int. Cl.
| | |
|---|---|
| *H04N 1/00* | (2006.01) |
| *G06F 17/24* | (2006.01) |
| *G06F 17/22* | (2006.01) |
| *G06F 3/0481* | (2013.01) |
| *G06F 3/0484* | (2013.01) |
| *G06F 9/54* | (2006.01) |
| *G06K 9/00* | (2006.01) |
| *G06K 9/03* | (2006.01) |

(Continued)

(52) U.S. Cl.
CPC ............ *G06F 17/24* (2013.01); *G06F 3/0481* (2013.01); *G06F 3/04842* (2013.01); *G06F 9/543* (2013.01); *G06F 17/2247* (2013.01); *G06F 17/30011* (2013.01); *G06K 9/00483* (2013.01); *G06K 9/036* (2013.01); *G06F 17/241* (2013.01); *G06F 17/3089* (2013.01); *G06F 17/30253* (2013.01); *G06F 17/30722* (2013.01); *G06F 17/30728* (2013.01); *G06F 17/30861* (2013.01); *G06F 17/30864* (2013.01); *G06F 17/30876* (2013.01); *G06K 9/00422* (2013.01); *G06K 9/00442* (2013.01); *G06K 9/00469* (2013.01); *G06K 17/0016* (2013.01)

(58) Field of Classification Search
CPC ......... G06F 17/30728; G06F 17/30011; G06F 17/30722; G06F 17/30822; G06F 17/241; G06F 17/212; G06F 9/543; G06F 17/30864
USPC ......................................................... 715/234
See application file for complete search history.

(56) References Cited

U.S. PATENT DOCUMENTS

| | | |
|---|---|---|
| 5,280,367 A | 1/1994 | Zuniga |
| 5,448,695 A | 9/1995 | Douglas et al. |

(Continued)

FOREIGN PATENT DOCUMENTS

| | | |
|---|---|---|
| WO | WO2012057726 | 5/2012 |
| WO | WO2014072767 A1 | 5/2014 |

OTHER PUBLICATIONS

"Bohman, P. ""Introduction to Web Accessibility""", Oct. 2003, ebAIM, printed Apr. 17, 2004,<http://www.webaim.org/intro/?templatetype=3> (p. 1- 6)".

(Continued)

*Primary Examiner* — Cesar Paula
*Assistant Examiner* — Luu-Phuong Nguyen
(74) *Attorney, Agent, or Firm* — Young Basile Hanlon & MacFarlane, P.C.

(57) ABSTRACT

A method for automatic document citations includes outputting, by one or more computing devices and for display, a first interface area in which an editable document is displayed and a second interface area outside of the first interface area. The method also includes, in response to a paste command, inserting copied content into the editable document and defining, in the second interface area, an interface element that includes source information regarding the copied content.

16 Claims, 6 Drawing Sheets

(51) Int. Cl.
  *G06F 17/30* (2006.01)
  *G06K 17/00* (2006.01)

(56) References Cited

U.S. PATENT DOCUMENTS

| | | | |
|---|---|---|---|
| 5,493,692 | A | 2/1996 | Theimer et al. |
| 5,544,049 | A | 8/1996 | Henderson et al. |
| 5,600,778 | A | 2/1997 | Swanson et al. |
| 5,613,163 | A | 3/1997 | Marron et al. |
| 5,721,849 | A | 2/1998 | Amro |
| 5,790,127 | A | 8/1998 | Anderson et al. |
| 5,821,928 | A | 10/1998 | Melkus et al. |
| 5,826,015 | A | 10/1998 | Schmidt |
| 5,845,300 | A | 12/1998 | Comer et al. |
| 5,859,640 | A | 1/1999 | de Judicibus |
| 5,877,763 | A | 3/1999 | Berry et al. |
| 5,883,626 | A | 3/1999 | Glaser et al. |
| 5,905,991 | A | 5/1999 | Reynolds |
| 5,966,121 | A | 10/1999 | Hubbell et al. |
| 6,005,575 | A | 12/1999 | Colleran et al. |
| 6,018,341 | A | 1/2000 | Berry et al. |
| 6,272,490 | B1 | 8/2001 | Yamakita |
| 6,295,542 | B1 | 9/2001 | Corbin |
| 6,301,573 | B1 | 10/2001 | McIlwaine et al. |
| 6,377,965 | B1 | 4/2002 | Hachamovitch et al. |
| 6,421,678 | B2 | 7/2002 | Smiga et al. |
| 6,463,078 | B1 | 10/2002 | Engstrom et al. |
| 6,546,393 | B1 | 4/2003 | Khan |
| 6,564,213 | B1 | 5/2003 | Ortega et al. |
| 6,647,383 | B1 | 11/2003 | August et al. |
| 6,654,038 | B1 | 11/2003 | Gajewska et al. |
| 6,751,604 | B2 | 6/2004 | Barney et al. |
| 6,789,251 | B1 | 9/2004 | Johnson |
| 6,820,075 | B2 | 11/2004 | Shanahan et al. |
| 6,865,714 | B1 | 3/2005 | Liu et al. |
| 6,889,337 | B1 | 5/2005 | Yee |
| 6,907,447 | B1 | 6/2005 | Cooperman et al. |
| 6,944,821 | B1* | 9/2005 | Bates ............... G06F 9/543 715/209 |
| 6,980,977 | B2 | 12/2005 | Hoshi et al. |
| 7,003,506 | B1 | 2/2006 | Fisk et al. |
| 7,003,737 | B2 | 2/2006 | Chiu et al. |
| 7,031,963 | B1 | 4/2006 | Bae |
| 7,051,277 | B2 | 5/2006 | Kephart et al. |
| 7,073,129 | B1 | 7/2006 | Robarts et al. |
| 7,103,835 | B1 | 9/2006 | Yankovich et al. |
| 7,127,674 | B1 | 10/2006 | Carroll et al. |
| 7,146,422 | B1 | 12/2006 | Marlatt et al. |
| 7,295,995 | B1 | 11/2007 | York et al. |
| 7,353,252 | B1 | 4/2008 | Yang et al. |
| 7,353,397 | B1 | 4/2008 | Herbach |
| 7,370,274 | B1 | 5/2008 | Stuple et al. |
| 7,380,218 | B2 | 5/2008 | Rundell |
| 7,386,789 | B2 | 6/2008 | Chao et al. |
| 7,392,249 | B1 | 6/2008 | Harris et al. |
| 7,395,507 | B2 | 7/2008 | Robarts et al. |
| 7,406,659 | B2 | 7/2008 | Klein et al. |
| 7,451,389 | B2 | 11/2008 | Huynh et al. |
| 7,480,715 | B1 | 1/2009 | Barker et al. |
| 7,487,145 | B1 | 2/2009 | Gibbs et al. |
| 7,499,919 | B2 | 3/2009 | Meyerzon et al. |
| 7,499,940 | B1 | 3/2009 | Gibbs |
| 7,647,312 | B2 | 1/2010 | Dai |
| 7,664,786 | B2 | 2/2010 | Oh et al. |
| 7,685,144 | B1 | 3/2010 | Katragadda |
| 7,685,516 | B2 | 3/2010 | Fischer |
| 7,716,236 | B2 | 5/2010 | Sidhu et al. |
| 7,734,627 | B1 | 6/2010 | Tong |
| 7,756,935 | B2 | 7/2010 | Gaucas |
| 7,761,788 | B1 | 7/2010 | McKnight et al. |
| 7,769,579 | B2 | 8/2010 | Zhao et al. |
| 7,774,328 | B2 | 8/2010 | Hogue et al. |
| 7,779,355 | B1 | 8/2010 | Erol et al. |
| 7,783,965 | B1 | 8/2010 | Dowd et al. |
| 7,818,678 | B2 | 10/2010 | Massand |
| 7,836,044 | B2 | 11/2010 | Kamvar et al. |
| 7,917,848 | B2 | 3/2011 | Harmon et al. |
| 8,020,003 | B2 | 9/2011 | Fischer |
| 8,020,112 | B2 | 9/2011 | Ozzie et al. |
| 8,027,974 | B2 | 9/2011 | Gibbs |
| 8,051,088 | B1 | 11/2011 | Tibbetts et al. |
| 8,086,960 | B1 | 12/2011 | Gopalakrishna et al. |
| 8,091,020 | B2 | 1/2012 | Kuppusamy et al. |
| 8,117,535 | B2 | 2/2012 | Beyer et al. |
| 8,185,448 | B1 | 5/2012 | Myslinski |
| 8,224,802 | B2 | 7/2012 | Hogue |
| 8,229,795 | B1 | 7/2012 | Myslinski |
| 8,239,751 | B1 | 8/2012 | Rochelle et al. |
| 8,260,785 | B2 | 9/2012 | Hogue et al. |
| 8,261,192 | B2 | 9/2012 | Djabarov |
| 8,346,620 | B2 | 1/2013 | King et al. |
| 8,346,877 | B2 | 1/2013 | Turner |
| 8,359,550 | B2 | 1/2013 | Meyer et al. |
| 8,370,275 | B2 | 2/2013 | Bhattacharya et al. |
| 8,386,914 | B2 | 2/2013 | Baluja et al. |
| 8,434,134 | B2 | 4/2013 | Khosrowshahi et al. |
| 8,453,066 | B2 | 5/2013 | Ozzie et al. |
| 8,458,046 | B2 | 6/2013 | Myslinski |
| 8,479,094 | B2* | 7/2013 | Fouts ............... G06F 17/21 707/770 |
| 8,572,388 | B2 | 10/2013 | Boemker et al. |
| 8,595,174 | B2 | 11/2013 | Gao et al. |
| 8,621,222 | B1 | 12/2013 | Das |
| 8,666,961 | B1* | 3/2014 | Qureshi ............ G06F 17/30312 707/705 |
| 8,667,394 | B1 | 3/2014 | Spencer |
| 8,782,516 | B1 | 7/2014 | Dozier |
| 8,799,765 | B1 | 8/2014 | MacInnis et al. |
| 8,856,640 | B1 | 10/2014 | Barr et al. |
| 8,856,645 | B2 | 10/2014 | Vandervort et al. |
| 8,904,284 | B2 | 12/2014 | Grant et al. |
| 9,298,823 | B2* | 3/2016 | Cragun ............ G06F 17/30882 |
| 2001/0025287 | A1 | 9/2001 | Okabe et al. |
| 2002/0010725 | A1 | 1/2002 | Mo |
| 2002/0029337 | A1 | 3/2002 | Sudia et al. |
| 2002/0035714 | A1 | 3/2002 | Kikuchi et al. |
| 2002/0069223 | A1 | 6/2002 | Goodisman et al. |
| 2002/0070977 | A1 | 6/2002 | Morcos et al. |
| 2002/0103914 | A1 | 8/2002 | Dutta et al. |
| 2002/0129100 | A1 | 9/2002 | Dutta et al. |
| 2002/0152255 | A1 | 10/2002 | Smith, Jr. et al. |
| 2002/0161839 | A1 | 10/2002 | Colasurdo et al. |
| 2002/0187815 | A1 | 12/2002 | Deeds et al. |
| 2003/0046263 | A1 | 3/2003 | Castellanos et al. |
| 2003/0046277 | A1* | 3/2003 | Jackson ............ G06F 17/3061 |
| 2003/0058286 | A1 | 3/2003 | Dando |
| 2003/0069877 | A1 | 4/2003 | Grefenstette et al. |
| 2003/0156130 | A1 | 8/2003 | James et al. |
| 2003/0172353 | A1 | 9/2003 | Cragun |
| 2003/0200192 | A1 | 10/2003 | Bell et al. |
| 2003/0234822 | A1 | 12/2003 | Spisak |
| 2004/0061716 | A1 | 4/2004 | Cheung et al. |
| 2004/0062213 | A1 | 4/2004 | Koss |
| 2004/0122846 | A1 | 6/2004 | Chess et al. |
| 2004/0139465 | A1 | 7/2004 | Matthews, III et al. |
| 2004/0140901 | A1 | 7/2004 | Marsh |
| 2004/0145607 | A1 | 7/2004 | Alderson |
| 2004/0153973 | A1 | 8/2004 | Horwitz |
| 2004/0164991 | A1 | 8/2004 | Rose |
| 2004/0177319 | A1 | 9/2004 | Horn |
| 2005/0024487 | A1 | 2/2005 | Chen |
| 2005/0028081 | A1 | 2/2005 | Arcuri et al. |
| 2005/0034060 | A1 | 2/2005 | Kotler et al. |
| 2005/0039191 | A1 | 2/2005 | Hewson et al. |
| 2005/0044132 | A1 | 2/2005 | Campbell et al. |
| 2005/0044369 | A1 | 2/2005 | Anantharaman |
| 2005/0055416 | A1 | 3/2005 | Heikes et al. |
| 2005/0120308 | A1 | 6/2005 | Gibson et al. |
| 2005/0144162 | A1 | 6/2005 | Liang |
| 2005/0144573 | A1 | 6/2005 | Moody et al. |
| 2005/0160065 | A1 | 7/2005 | Seeman |
| 2005/0183001 | A1 | 8/2005 | Carter et al. |
| 2005/0183006 | A1 | 8/2005 | Rivers-Moore et al. |
| 2005/0198589 | A1 | 9/2005 | Heikes et al. |

(56) References Cited

U.S. PATENT DOCUMENTS

| | | |
|---|---|---|
| 2005/0210256 A1 | 9/2005 | Meier et al. |
| 2005/0246653 A1 | 11/2005 | Gibson et al. |
| 2006/0005142 A1 | 1/2006 | Karstens |
| 2006/0010865 A1 | 1/2006 | Walker |
| 2006/0041836 A1 | 2/2006 | Gordon et al. |
| 2006/0047682 A1 | 3/2006 | Black et al. |
| 2006/0080303 A1 | 4/2006 | Sargent et al. |
| 2006/0106778 A1 | 5/2006 | Baldwin |
| 2006/0136552 A1 | 6/2006 | Krane et al. |
| 2006/0150087 A1 | 7/2006 | Cronenberger et al. |
| 2006/0190435 A1 | 8/2006 | Heidloff et al. |
| 2006/0213993 A1 | 9/2006 | Tomita |
| 2006/0236217 A1* | 10/2006 | Michelstein ........ G06F 17/2247 715/255 |
| 2006/0248070 A1 | 11/2006 | Dejean et al. |
| 2007/0005581 A1 | 1/2007 | Arrouye et al. |
| 2007/0005697 A1 | 1/2007 | Yuan et al. |
| 2007/0033200 A1 | 2/2007 | Gillespie |
| 2007/0143317 A1 | 6/2007 | Hogue et al. |
| 2007/0150800 A1 | 6/2007 | Betz et al. |
| 2007/0156761 A1 | 7/2007 | Smith |
| 2007/0162907 A1 | 7/2007 | Herlocker et al. |
| 2007/0168355 A1 | 7/2007 | Dozier et al. |
| 2007/0198952 A1 | 8/2007 | Pittenger |
| 2007/0220259 A1 | 9/2007 | Pavlicic |
| 2007/0280205 A1 | 12/2007 | Howell et al. |
| 2007/0291297 A1 | 12/2007 | Harmon et al. |
| 2008/0022107 A1 | 1/2008 | Pickles et al. |
| 2008/0028284 A1 | 1/2008 | Chen |
| 2008/0034213 A1 | 2/2008 | Boemker et al. |
| 2008/0059539 A1 | 3/2008 | Chin et al. |
| 2008/0077571 A1 | 3/2008 | Harris et al. |
| 2008/0082907 A1 | 4/2008 | Sorotokin et al. |
| 2008/0120319 A1 | 5/2008 | Drews et al. |
| 2008/0172608 A1 | 7/2008 | Patrawala et al. |
| 2008/0208969 A1 | 8/2008 | Van Riel |
| 2008/0239413 A1 | 10/2008 | Vuong et al. |
| 2008/0320397 A1 | 12/2008 | Do et al. |
| 2009/0006936 A1 | 1/2009 | Parker et al. |
| 2009/0013244 A1 | 1/2009 | Cudich et al. |
| 2009/0044143 A1 | 2/2009 | Karstens |
| 2009/0044146 A1 | 2/2009 | Patel et al. |
| 2009/0083245 A1 | 3/2009 | Ayotte et al. |
| 2009/0094178 A1 | 4/2009 | Aoki |
| 2009/0132560 A1 | 5/2009 | Vignet |
| 2009/0192845 A1 | 7/2009 | Gudipaty et al. |
| 2009/0198670 A1 | 8/2009 | Shiffer et al. |
| 2009/0204818 A1 | 8/2009 | Shin et al. |
| 2009/0282144 A1 | 11/2009 | Sherrets et al. |
| 2009/0287988 A1* | 11/2009 | Cohen ................. G06F 9/543 715/204 |
| 2009/0292673 A1 | 11/2009 | Carroll |
| 2010/0070448 A1 | 3/2010 | Omoigui |
| 2010/0070881 A1 | 3/2010 | Hanson et al. |
| 2010/0076946 A1 | 3/2010 | Barker et al. |
| 2010/0100743 A1 | 4/2010 | Ali et al. |
| 2010/0121888 A1 | 5/2010 | Cutting et al. |
| 2010/0131523 A1 | 5/2010 | Yu et al. |
| 2010/0180200 A1 | 7/2010 | Donneau-Golencer et al. |
| 2010/0191744 A1 | 7/2010 | Meyerzon et al. |
| 2010/0198821 A1 | 8/2010 | Loritz et al. |
| 2010/0223541 A1 | 9/2010 | Clee et al. |
| 2010/0251086 A1 | 9/2010 | Haumont et al. |
| 2010/0268700 A1 | 10/2010 | Wissner et al. |
| 2010/0269035 A1 | 10/2010 | Meyer et al. |
| 2010/0275109 A1 | 10/2010 | Morrill |
| 2010/0281353 A1 | 11/2010 | Rubin |
| 2011/0016106 A1 | 1/2011 | Xia |
| 2011/0023022 A1 | 1/2011 | Harper et al. |
| 2011/0043652 A1 | 2/2011 | King et al. |
| 2011/0060584 A1 | 3/2011 | Ferrucci et al. |
| 2011/0072338 A1 | 3/2011 | Caldwell |
| 2011/0082876 A1 | 4/2011 | Lu et al. |
| 2011/0087973 A1 | 4/2011 | Martin et al. |
| 2011/0126093 A1 | 5/2011 | Ozzie et al. |
| 2011/0173210 A1 | 7/2011 | Ahn et al. |
| 2011/0179378 A1 | 7/2011 | Wheeler et al. |
| 2011/0191276 A1 | 8/2011 | Cafarella et al. |
| 2011/0208769 A1* | 8/2011 | Kemp ................. G06Q 50/18 707/769 |
| 2011/0209064 A1 | 8/2011 | Jorgensen et al. |
| 2011/0209075 A1 | 8/2011 | Wan |
| 2011/0219291 A1 | 9/2011 | Lisa |
| 2011/0225482 A1 | 9/2011 | Chan et al. |
| 2011/0225490 A1 | 9/2011 | Meunier |
| 2011/0252312 A1 | 10/2011 | Lemonik et al. |
| 2011/0276538 A1 | 11/2011 | Knapp et al. |
| 2011/0296291 A1 | 12/2011 | Melkinov et al. |
| 2011/0306028 A1 | 12/2011 | Galimore |
| 2012/0078826 A1 | 3/2012 | Ferrucci et al. |
| 2012/0084644 A1 | 4/2012 | Robert et al. |
| 2012/0095979 A1 | 4/2012 | Aftab et al. |
| 2012/0116812 A1 | 5/2012 | Boone et al. |
| 2012/0124053 A1 | 5/2012 | Ritchford et al. |
| 2012/0166924 A1 | 6/2012 | Larson et al. |
| 2012/0185473 A1 | 7/2012 | Ponting et al. |
| 2012/0203734 A1 | 8/2012 | Spivack et al. |
| 2012/0226646 A1 | 9/2012 | Donoho et al. |
| 2012/0254730 A1 | 10/2012 | Sunderland et al. |
| 2012/0284602 A1 | 11/2012 | Seed et al. |
| 2012/0304046 A1 | 11/2012 | Neill et al. |
| 2012/0317046 A1 | 12/2012 | Myslinski |
| 2013/0036344 A1 | 2/2013 | Ahmed et al. |
| 2013/0041685 A1 | 2/2013 | Yegnanarayanan |
| 2013/0132566 A1 | 5/2013 | Olsen et al. |
| 2013/0165086 A1 | 6/2013 | Doulton |
| 2013/0212062 A1 | 8/2013 | Levy et al. |
| 2013/0246346 A1 | 9/2013 | Khosrowshahi et al. |
| 2013/0268830 A1 | 10/2013 | Khosrowshahi et al. |
| 2014/0013197 A1 | 1/2014 | McAfee et al. |
| 2014/0032913 A1 | 1/2014 | Tenenboym et al. |
| 2014/0040249 A1 | 2/2014 | Ploesser et al. |
| 2014/0236958 A1 | 8/2014 | Vaughn |
| 2014/0351693 A1* | 11/2014 | Glassop ................ G06Q 10/10 715/235 |
| 2015/0012805 A1 | 1/2015 | Bleiweiss et al. |

OTHER PUBLICATIONS

"Caldwell et al., ""Web Content Accessibility Guidelines 2.0, W3C Working Draft Mar. 11, 2004""", Mar. 11, 2004, WorldWide Web Consortium (p. 1-56)".

Francik, E., Computer-& screen-based interfaces: Universal design filter, Human Factors Engineering, Pacific Bell Version 2, Jun. 6, 1996.

Griesser, A., "A generic editor Full text," pp. 50-55, 1997 ACM Press NewYork, NY, USA.

Jacobs, Ian, et al., "User Agent Accessibility Guidelines 1.0, W3C Recommendation Dec. 17, 2002", World Wide Web Consortium, 115 pages.

Treviranus, Jutta, et al., "Authoring Tool Accessibility Guidelines 1.0, W3C Recommendation Feb. 3, 2000", World Wide Web Consortium (p. 1-22).

Jourdan, Guy-Vincent, CSI 3140 WWW Structures, Techniques and Standards, Cascading Style Sheets, power point slides, published Feb. 16, 2010.

W3C, Cascading Style sheets Level 2 Revision 1 Specification, Apr. 15, 2011, 487 pages.

David Sawyer McFarland, "CSS the missing manual", O'Reilly, Aug. 2009, pp. 7-101, 134-138, 428-429.

Herb Tyson, Microsoft Word 2010 Bible, John Wiley & Sons, pp. 221, 757, 833, Jun. 21, 2010.

Timestamp from Wikipedia, accessed from https://en.wikipedialcorg/wiki/Timestamp, archived by WaybackMachine on Sep. 15, 2012, pp. 1-2.

Ashman. "Electronic Document Addressing: Dealing with Change." ACM Computing Surveys, vol. 32, No. 3, Sep. 2000, pp. 201-212.

ISR and Written Opinion of the International Searching Authority in PCT Application No. PCT/US2011/037862, dated Oct. 31, 2011, 64 pages.

(56) References Cited

OTHER PUBLICATIONS

Electronic Signatures and Infrastructures ESI; PDF Advanced Electronic Signature Profiles; Part 4: PAdES Long Ter PAdES-LTV Profile, ETSI TS 102 778-4, V1.1.1, Jul. 2009, 19 pages.
Fox. "Maps API Blog: Creating Dynamic Client-side Maps Mashups with Google Spreadsheets." Mar. 2007, [retrieved on Dec. 5, 2011]. Retrieved from the Internet: <URL:http://googlemapsapi.blogspot.com/2007/03/creating-dynamic-client-side-maps.html>. 2 pages.
GeekRant.org' [online]. "How to Embed a Word Document in Another Word Document," Sep. 14, 2005, [retrieved on Dec. 5, 2011]. Retrieved from the Internet: <URL:http://www.geekrant.org/2005/09/14/word-embed-document/>. 6 pages.
Herrick. "Google this Using Google Apps for Collaboration and Productivity." Proceedings of the ACM Siguccs Fall Conference on User Services Conference, Siguccs '09, Jan. 2009, p. 55.
https://en.wikipedia.org/wiki/Backus%E2%80%93Naur_Form, as of Jul. 14, 2013.
https://en.wikipedia.org/wiki/Regular_expression, as of Sep. 2, 2013.
Kappe. "Hyper-G: A Distributed Hypermedia System." Proceedings of the International Networking Conference, 1993, [retrieved on Oct. 20, 2011]. Retrieved from the Internet: <URL:http://ftp.iicm.tugraz.at/pub/papers/inet93.pdf>. 9 pages.
Kircher. "Lazy Acquisition." Proceedings of the 6th European Conference on Pattern Languages of Programs, Jul. 2011, pp. 1-11.
Microsoft Support' [online]. "How to Embed and Automate Office Documents with Visual Basic," Mar. 27, 2007, [retrieved on Dec. 5, 2011]. Retrieved from the Internet: <URLhttp://support.microsoft.com/kb/242243>. 6 pages.
Microsoft Support' [online]. "OLE Concepts and Requirements Overview," Oct. 27, 1999, [retrieved on Dec. 2, 2011]. Retrieved from the Internet: <URL:http://support.microsoft.com/kb/86008>. 3 pages.
Oracle Provider for OLE DB—Developer's Guide. 10g Release 1 (10.1) Dec. 2003, Oracle Corp., 90 pages.
Pinkas et al. "CMS Advanced Electrponic Signatures," Request for Comments 5126, Feb. 2008, 142 pages.
WebArchive' [online]. "Supplementary Notes for MFC Programming Module 23 and Module 27: Interfaces, com.com + and OLE" in: http://www.tenouk.com/visualcplusmfc/mfcsupp/ole.html, Jan. 6, 2008, [retrieved on Dec. 5, 2011]. Retrieved from the Internet: <URL:http://web.archive.org/web/20091125073542/http://www.tenouk.com/visualcplusmfc/mfcsupp/ole.html>. 4 pages.

\* cited by examiner

US 9,703,763 B1

AUTOMATIC DOCUMENT CITATIONS BY UTILIZING COPIED CONTENT FOR CANDIDATE SOURCES

BACKGROUND

Keeping track of external sources is a key task of writing a research-based document. Users often perform research using sources available via the internet, for example, using a web browser. While researching, the user may review a large number of documents. If the user does not immediately write a citation for material that they incorporate into their research based document (e.g. by quoting), they may have difficulty later identifying the source in order to properly cite the source. For example, the user may forget from what source a particular quotation was derived, and subsequently be unable to find the original source again.

SUMMARY

The disclosure relates generally to automatic document citations.

One aspect of the disclosed embodiments is a method that includes outputting, by one or more computing devices and for display, a first interface area in which an editable document is displayed and a second interface area outside of the first interface area. In response to a paste command, the method includes inserting copied content into the editable document and defining, in the second interface area, an interface element that includes source information regarding the copied content.

Another aspect of the disclosed embodiments is an apparatus that includes a memory and a processor configured to execute instructions stored in the memory. When executed, the instructions cause the process to output, for display, a first interface area in which an editable document is displayed and a second interface area outside of the first interface area. In response to a paste command, the instructions cause the processor to insert copied content into the editable document, and define, in the second interface area, an interface element that includes source information regarding the copied content.

Another aspect of the disclosed embodiments is a non-transitory computer-readable storage device including program instructions that are executable by one or more processors. The program instructions, when executed, cause the one or more processors to perform operations. The operations include outputting, for display, a first interface area in which an editable document is displayed and a second interface area outside of the first interface area. In response to a paste command, the operations performed include inserting copied content into the editable document and defining, in the second interface area, an interface element that includes source information regarding the copied content.

BRIEF DESCRIPTION OF THE DRAWINGS

The description herein makes reference to the accompanying drawings wherein like reference numerals refer to like parts throughout the several views, and wherein.

DETAILED DESCRIPTION

According to the methods, systems, apparatuses, and computer programs that are discussed document citations can be added to a document in response to a paste operation that adds material to the document. The disclosure herein is directed to processes that are fully automated, where a citation is created without user input, as well as to processes that are semi-automated, where a citation is created with some user input.

Figure 1:
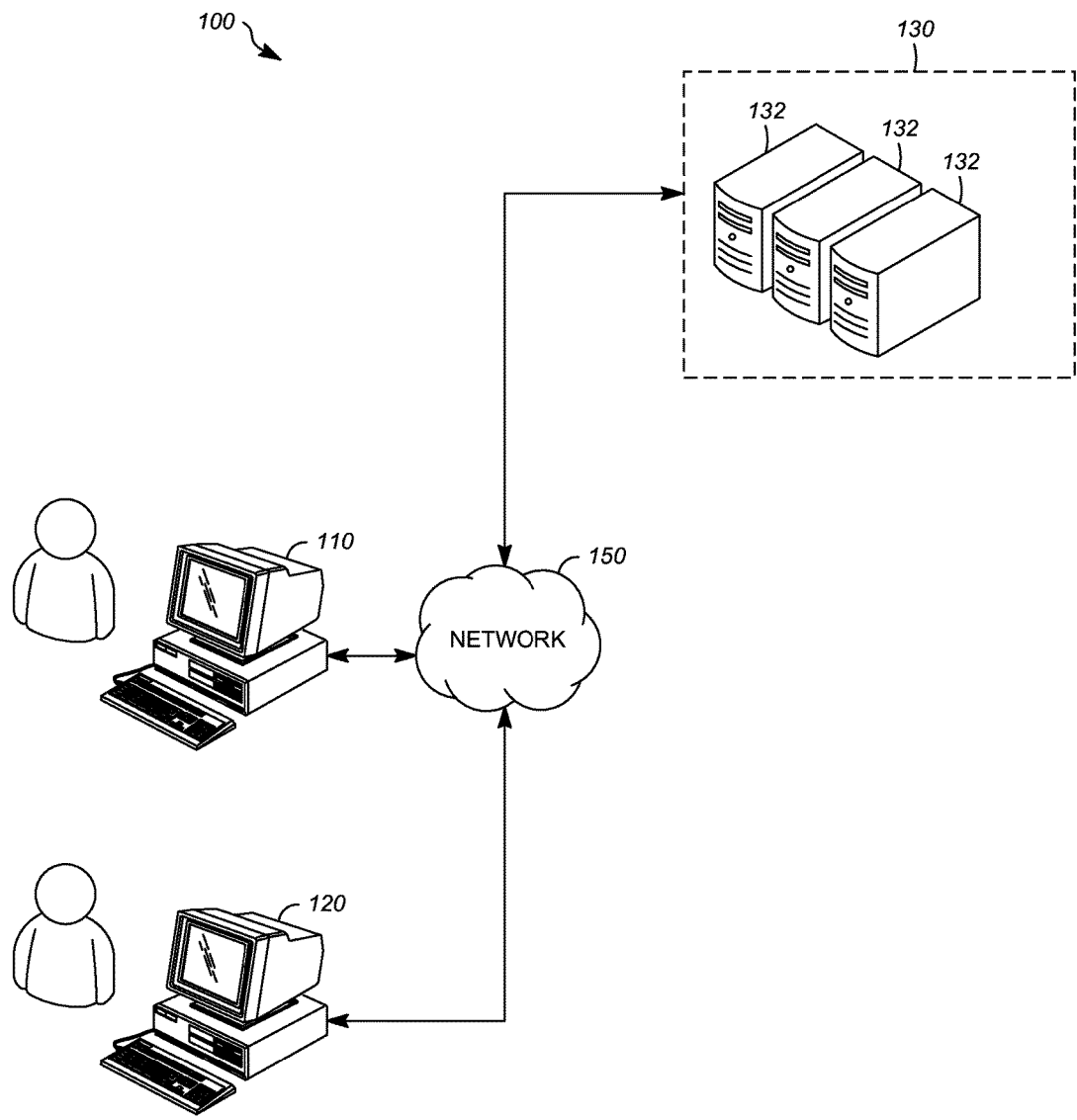
FIG. 1 is a block diagram showing an example of an environment in which a system for automatic document citations can be implemented.

FIG. 1 shows an example of an environment 100 in which a system for automatic document citations can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. One or more of the hosted applications can be a document editing application that that is operable to implement document creation and editing functions, and is operable to output, for display to a user, a user interface that allows the user to create and edit documents. The document editing application can be associated with a hosted document storage and retrieval application that allows the user to store, browse, organize, retrieve, view, delete, and/or perform other operations with respect to documents that are stored as data files at the application hosting service 130. The application hosting service can allow access to store, edit, delete, and/or view the documents by a single user, by a group of designated users, or by all users. The user interface for the document editing application can be output by the application hosting service 130 for display at a device associated with the user, such as the user system 110, by transmission of signals and/or data from the application hosting service to the user system 110 that, when interpreted by the user system 110, cause display of the interface at the user system 110. Various implementations of the document editing application are possible, and it should be understood that the functions and operations discussed herein can be performed solely at the application hosting service 130, solely at the user system 110, or at both the user system 110 and the application hosting service, with some of the functions and operations being performed at each of them.

Figure 2:
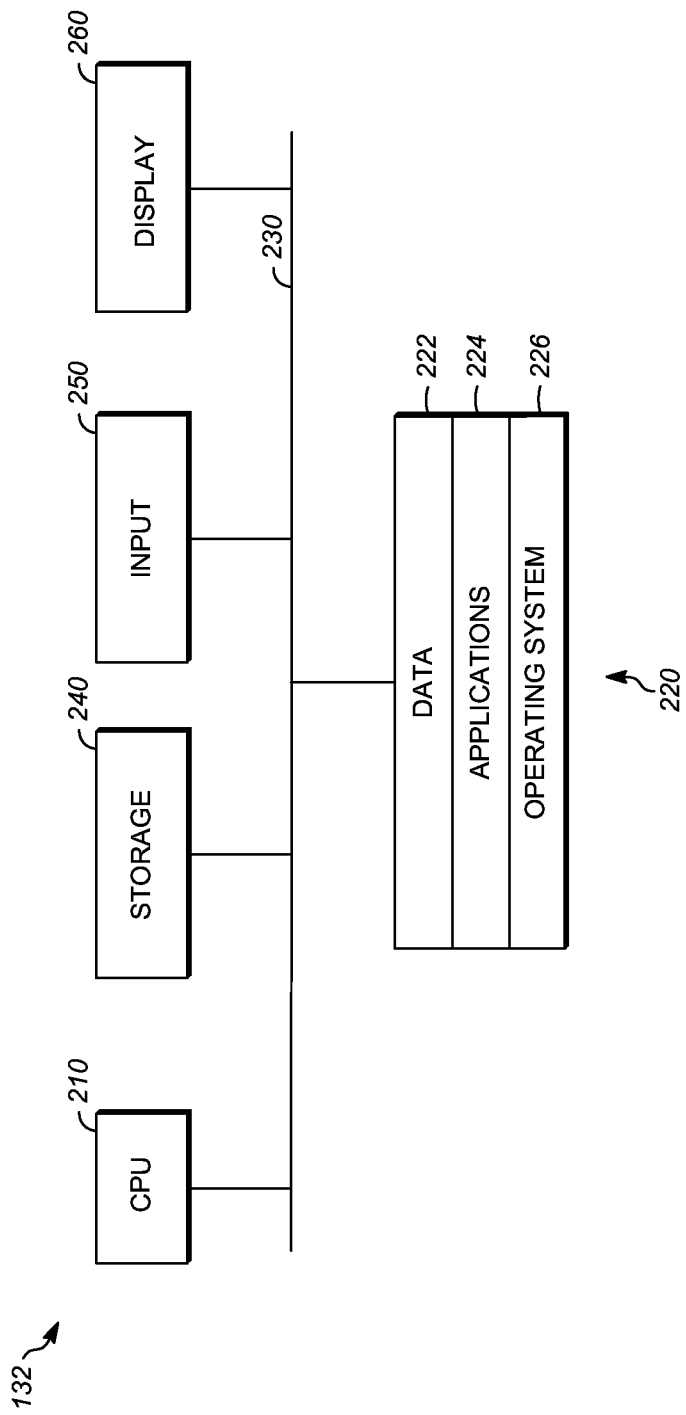
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
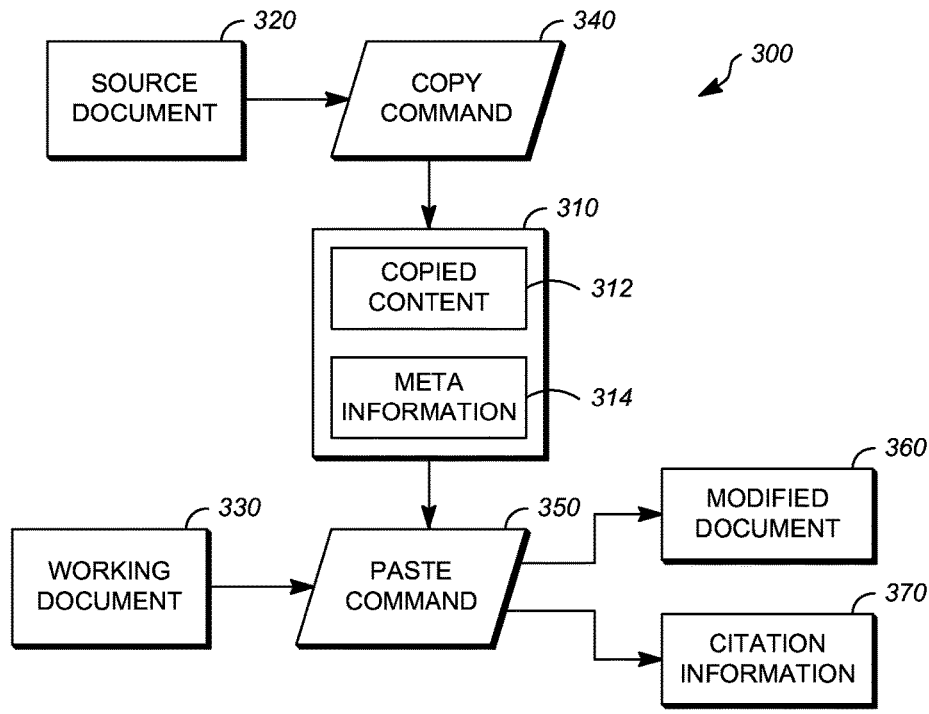
FIG. 3 is a block diagram showing a system for automatic document citations.

FIG. 3 is a block diagram showing a system 300 for automatic document citations. The system 300 utilizes a clipboard 310 to transfer content from a source document 320 to a working document 330 in response to a copy command 340 and a paste command 350. The source document 320 is the document from which content is copied or otherwise associated with the content. For example, the source document could be a web page displayed in a web browser. The working document 330 is an editable document that is being edited by a user of the document editing application, and is the active document at the time that the paste command 350 is received. As an example, the working document 330 can be a word processing document, having a designated area (e.g. pages) in which content can be added, deleted, and modified.

The clipboard 310 is part of an inter-application functionality commonly implemented by the operating environment of a computing device, and is also referred to herein as an inter-application clipboard. For example, the clipboard 310 can be implemented by the operating system of the user system 110.

The clipboard 310 allows content to be transferred from one document or application to another document or application. In response to the copy command 340 being received while the source document 320 is active, information from the source document 320 is stored by the clipboard 310. The copy command 340 is typically received in response to a user input, such as a key press, a mouse click, or a gesture input. The information that is stored at the clipboard 310 can correspond to a portion of the source document 320 that was the target of the copy command 340, such as content from the source document 320 that was selected when the copy command 340 was received. The information that is stored at the clipboard 310 in response to the copy command 340 includes copied content 312 and meta-information 314.

The copied content 312 includes one or more representations of the content that was indicated by the user as the target of the copy command 340. For example, the copied content 312 can include multiple copies of the content in different formats, with a subsequent paste command causing selection of a copy of the content that is compatible with the application that the content is being pasted into.

The meta-information 314 is information that relates to the copied content 312, but is not a representation of the copied content. Instead, the meta-information 314 includes information about some aspect of the copied content. The meta-information 314 can include information identifying the source document 320, which is referred to herein as source information. The meta-information 314 identifies the work that the copied content 312 was copied from. In some implementations, the meta-information 314 can be an address usable for obtaining a copy of the work that the copied content 312 was copied from. For example, if the source document 320 is a web page, the source information can be a uniform resource locator (URL). Other examples of source information are possible. The meta-information 314 can include other types of information, such as a title of the source document 320, a creation date associated with the source document 320, and an author name associated with the source document 320.

After the clipboard 310 has been populated with the copied content 312 and the meta-information 314 from the source document 320, the paste command 350 can use the contents of the clipboard 310 to create the citation information 370.

In response to the paste command 350 being received while the working document 330 is active, a modified document 360 is generated and citation information 370 is created. The paste command 350 is typically received in response to a user input, such as a key press, a mouse click, or a gesture input.

The modified document 360 is a copy of the working document 330 subsequent to incorporation of the copied content 312 from the clipboard 310 in the working document 330 in response to the paste command 350. The copied content 312 is incorporated in a conventional manner, such as by inserting the copied content into the working document 330 as a user-selected location, as designated by a cursor location or other input signal, upon receipt of the paste command 350.

The citation information 370 is created by the document editing application. In some implementations, the document editing application utilizes the meta-information 314 to create the citation information in a fully automated manner, in which the citation information 370 is created without further user input subsequent to the paste command 350. In other implementations, the document editing system can mark the copied content as potentially corresponding to a source, and prompt the user to define the citation information 370 in a semi-automated manner that utilizes the copied content 312 and/or the meta-information 314 in combination with one or more user inputs, as will be explained further herein.

The citation information 370 is separate from the body of the modified document 360 (e.g. editable text and/or objects), but can be stored in a common data file with the modified document. In some implementations, and as will be explained further herein, the citation information 370 is utilized by the document editing application to generate an interface element or graphical indicator that includes source information regarding the copied content 312. This interface element or graphical indicator is not incorporated in the body of the document itself, such as in an inline citation or footnote, but can be utilized to generate content such as an inline citation, footnote, endnote that is incorporated in the body of the document in an automated or manual process. In other implementations, the citation information is stored for subsequent use, such as automatic generation of footnotes or endnotes, without display of any manner of interface element or graphical indicator.

Figure 4:
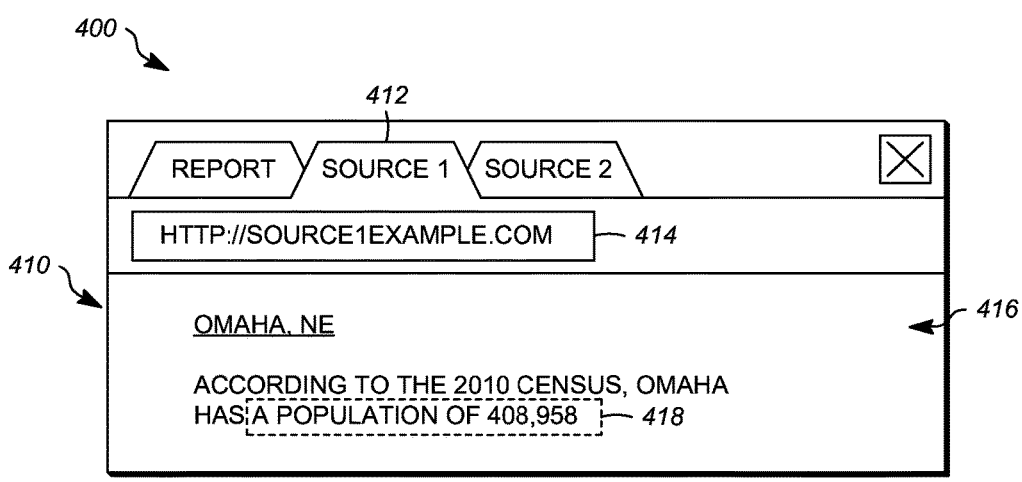
FIG. 4 is an illustration of an interface screen of a tabbed web browser showing a source document.

FIG. 4 is an illustration of a tabbed web browser 400 showing a source document 410. The source document 410 has a title 412, which is "Source 1," and source information in the form of a URL 414, which is "http://source1.example.com." The source document 410 also includes text 416, a portion of which has been selected by the user as selected text 418. Upon receiving the copy command 340, the selected text 418 is stored as the copied content 312 of the clipboard 310 and the URL 414 is stored as part of the meta-information 314.

Figure 5:
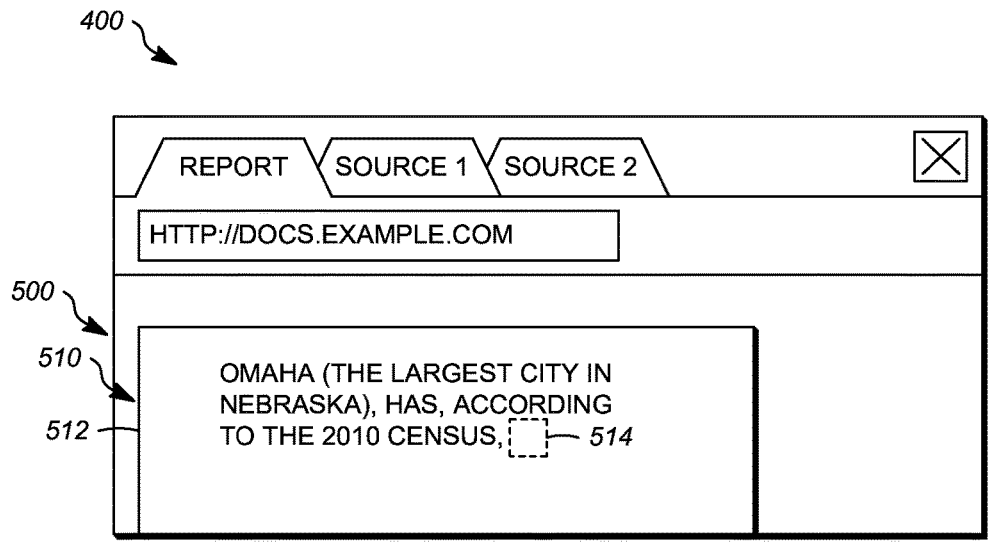
FIG. 5 is an illustration of the tabbed web browser showing a document editing interface prior to a paste operation.

FIG. 5 shows a document editing application 500 displayed in a tab of the tabbed web browser. For example, after the copy command 340 in the example of FIG. 4, the user clicks the "Report" tab 502, which corresponds to the document editing application 500. The document editing application includes a first interface area in which an editable document is displayed, namely a document area 510. The document area 510 includes text and/or objects that are displayed within a boundary 512 of the document area 510 and are editable by the user via the document editing application 500. As an example, the document area 510 can represent one or more document pages each having an outer periphery represented by the boundary 512.

Figure 6:
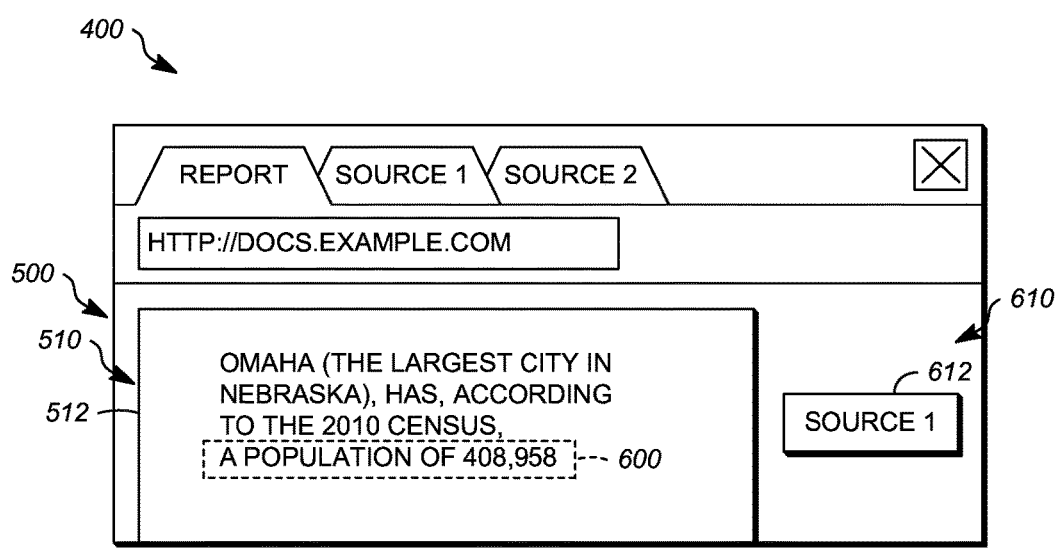
FIG. 6 is an illustration of the tabbed web browser showing a document editing interface subsequent to a paste operation.

In the document area 510, the user defines an insertion position 514, such as a cursor position, and a user input is received that corresponds to the paste command 350. As shown in FIG. 6, the paste command 350 causes the copied content 312 to be inserted into the document at the insertion location 514 as pasted content 600. Adjacent to the document area 510 but outside of the boundary 512 thereof, a second interface area, namely a citation area 610, is updated to include display of an interface element 612 that includes source information regarding the pasted content 600. The citation area 610 is located outside of the outer peripheries of the one of more pages of the document represented in the document area 510. In fully automated implementations, the interface element 612 can be generated immediately in response to the paste command 350 using the meta-information 314, as previously described. In semi-automated implementations, an interface for facilitating identification of the source can be displayed immediately in response to the paste command 350 or at a later time, such as in response to a user input.

The information in the interface element 612 can include, for example, at least one of a title of a document associated with the clipboard content or a URL of a document associated with the pasted content 600. The interface element 612 can include additional information, such as information describing the number of times that the source referred to in the interface element 612 is cited in the document. In some implementations, the interface element 612 is a user-activatable link to the URL of the document associated with the pasted content 600. The interface element 612 can, in some implementations, be graphically associated with the pasted content 600. Examples of graphical associations include symbols, color coding, highlighting, and leader lines. Other types of graphical associations can be utilized.

Figure 7:
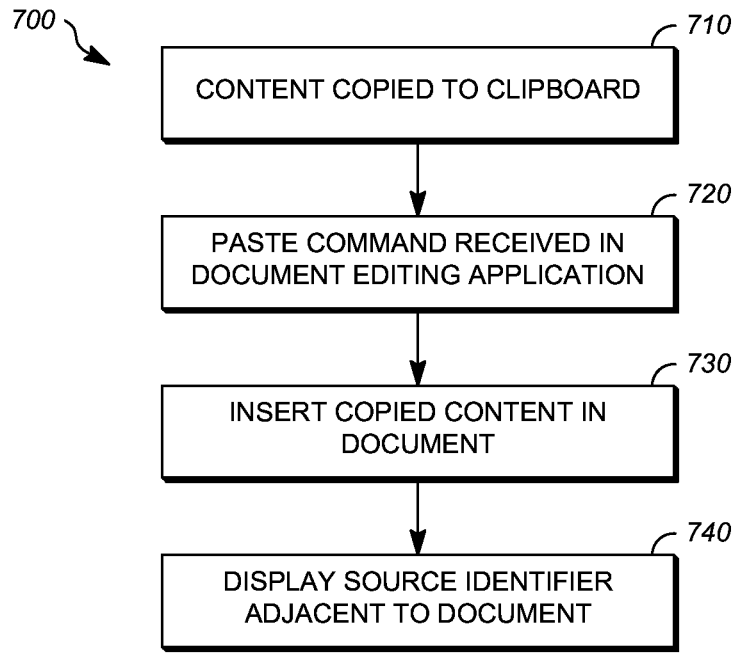
FIG. 7 is a flowchart showing a first example of a process for automatic document citations.

FIG. 7 is a flowchart showing a first example of a process 700 for automatic document citations. The operations described in connection with the process 700 can be performed at one or more computers, such as at the one or more server computers 132 of the application hosting service 130, or at the user system 110. When an operation is described as being performed by one or more computers, it is completed when it is performed by one computer working alone, or by multiple computers working together. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of one of the server computers 132 and be executable by the CPU 210 thereof.

In operation 710, content is copied to the clipboard 310. This can be performed in the manner described with respect to the copy command 340, and causes the copied content 312 and the meta-information 314 to be stored at the clipboard 310.

In operation 720, the application focus has changed to the document editing application 500, and the paste command 350 is received at the document editing application. In operation 730 the copied content 312 is inserted into the document, thereby defining the modified document 360. In operation 740 a source identifier is displayed adjacent to the document, such as by defining the citation information 370 based on the meta-information 314 and generating the interface element 612 for display in the citation area 610 as previously described.

Figure 8:
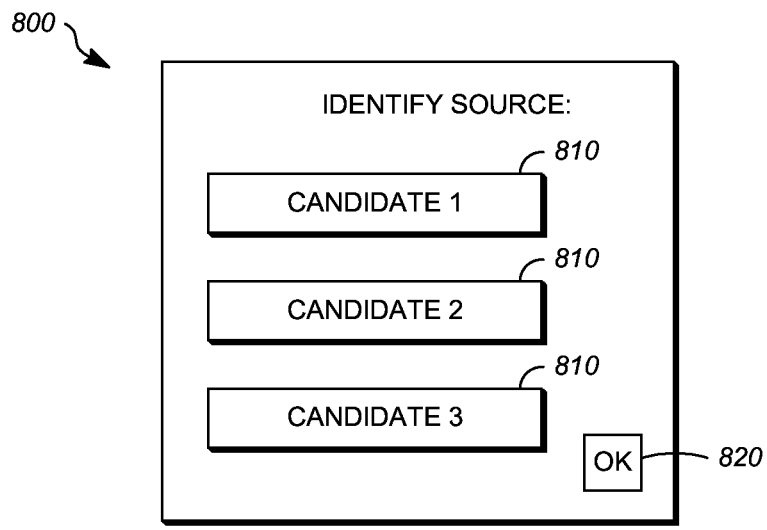
FIG. 8 is an illustration of an interface screen for identifying a source.

FIG. 8 is an illustration of an interface screen 800 for identifying a source in order to define the citation information 370 in a semi-automated process. In this example, the citation information 370 is defined with respect to previously pasted content, either by displaying the interface screen 800 immediately after the content is pasted or at a later time, for example, by selection of the pasted content by the user in combination with a user input that causes display of the interface screen 800.

The interface screen 800 includes one or more candidate sources 810, which are each displayed in or associated with an interface element for selecting it. The candidate sources 810 represent documents and source information that may correspond to the previously pasted content. In one implementation, each of the candidate sources 810 corresponds to a concurrently open document, such as a currently open browser tab in the tabbed web browser 400. In another implementation, each of the candidate sources corresponds to a document that was previously viewed in the tabbed web browser 400, as indicated by browser history information. In another implementation, the previously pasted text is passed as an input to a search engine, and each of the candidate sources 810 is associated with a result that was identified by the search engine as being related to the previously pasted text. After selecting one of the candidate sources 810, such as by clicking the candidate source 810 and then clicking a confirmation button 820, the citation information 370 is updated to include information associated with the candidate source 810, and information can be displayed by the document editing application 500, such as in the manner described with respect to the interface element 612.

Figure 9:
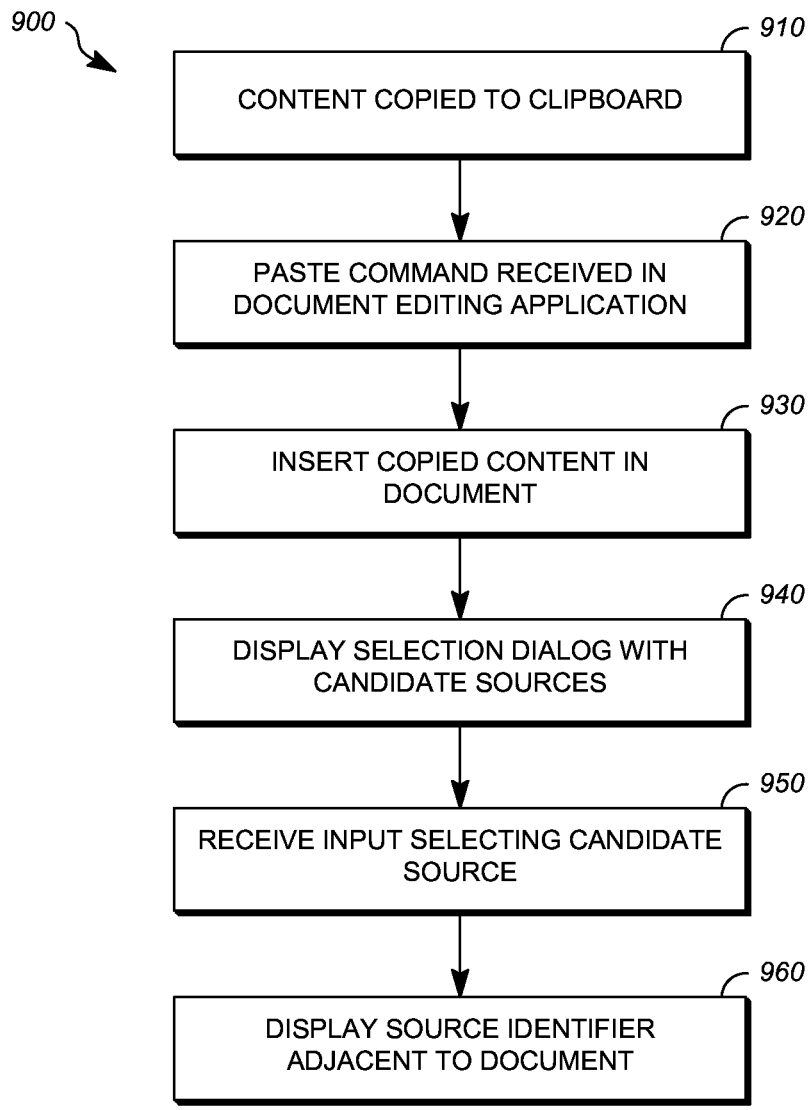
FIG. 9 is a flowchart showing a second example of a process for automatic document citations.

FIG. 9 is a flowchart showing a second example of a process for automatic document citations. The operations described in connection with the process 900 can be performed at one or more computers, such as at the one or more server computers 132 of the application hosting service 130, or at the user system 110. When an operation is described as being performed by one or more computers, it is completed when it is performed by one computer working alone, or by multiple computers working together. The operations described in connection with the process 900 can be embodied as a non-transitory computer readable storage medium including program instructions executable by one or more processors that, when executed, cause the one or more processors to perform the operations. For example, the operations described in connection with the process 900 could be stored at the memory 220 of one of the server computers 132 and be executable by the CPU 210 thereof.

Operations 910, 920, and 930 are performed in the manner described with respect to operations 710, 720, and 730, respectively. In operation 940, a selection dialog is displayed that shows one or more candidate sources. This can be done in the manner described with respect to the interface screen 800 and the candidate sources 810. In operation 950, a selection is received of one of the candidate sources, and the corresponding information is utilized as source information. In operation 960, a source identifier can be displayed adjacent to the document, for example, as described with respect to operation 740.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
outputting, by one or more computing devices and for display, a first interface area in which an editable document is displayed and a second interface area outside of the first interface area;
in response to a paste command, inserting copied content into the editable document;
identifying a plurality of candidate sources for the copied content, each candidate source being a distinct source of the copied content, at least some of the candidate sources being identified based on documents concurrently open in a third interface area outside of the first interface area and the second interface area;
outputting, in the second interface area, a plurality of interface elements, wherein each respective interface element corresponds to a respective candidate source for the copied content;
receiving, from a user, a selection of one of the interface elements; and
generating, by the one or more computing devices, citation information in the editable document based on the candidate source associated with the selected one of the interface elements.

2. The method of claim 1, wherein each candidate source includes at least one of a title of a document associated with the copied content or a URL of a document associated with the copied content.

3. The method of claim 1, wherein the first interface area represents one or more document pages each having an outer periphery, and the second interface area is located outside of the outer peripheries of each of the one of more document pages.

4. The method of claim 1, wherein the copied content is received from an inter-application clipboard.

5. The method of claim 1, wherein the copied content is received from an inter-application clipboard and at least some of the candidate sources of the plurality of candidate sources are associated with browser history information.

6. The method of claim 1, wherein the interface element includes an indication of a number of times each candidate source is referenced in the editable document.

7. The method of claim 1, wherein the documents concurrently open are documents concurrently open in a browser.

8. An apparatus comprising:
a memory; and
a processor configured to execute instructions stored in the memory to:
output, for display, a first interface area in which an editable document is displayed and a second interface area outside of the first interface area,
in response to a paste command,
insert copied content into the editable document, and
output, in the second interface area, a plurality of interface elements, each interface element associated with a candidate source, other than the editable document, for the copied content, at least some of the candidate sources are associated with results of a search function based on the copied content.

9. The apparatus of claim 8, wherein each candidate source includes at least one of a title of a document associated with the copied content or a URL of a document associated with the copied content.

10. The apparatus of claim 8, wherein the first interface area represents one or more document pages each having an outer periphery, and the second interface area is located outside of the outer peripheries of each of the one of more document pages.

11. The apparatus of claim 8, wherein the copied content is received from an inter-application clipboard.

12. The apparatus of claim 8, wherein output of the interface element in the second area interface occurs in response to the paste command.

13. The apparatus of claim 8, wherein output of the interface element in the second interface area occurs in response to a selection, by a user, of the copied content in the editable document in combination with a user input that causes display of the candidate sources.

14. A non-transitory computer-readable storage device including program instructions executable by one or more processors that, when executed, cause the one or more processors to perform operations, the operations comprising:
- outputting, for display, a first interface area in which an editable document is displayed and a second interface area outside of the first interface area;
- in response to a paste command, inserting copied content into the editable document;
- identifying a plurality of candidate sources for the copied content, at least some of the candidate sources being identified based on documents concurrently open in a third interface area outside of the first interface area and the second interface area, and at least some of the candidate sources are associated with results of a search function based on the copied content; and
- outputting, in the second interface area, a plurality of interface elements, wherein each respective interface element corresponds to a respective candidate source for the copied content.

15. The non-transitory computer-readable storage device of claim 14, wherein each candidate source includes at least one of a title of a document associated with the copied content or a URL of a document associated with the copied content.

16. The non-transitory computer-readable storage device of claim 14, wherein the first interface area represents one or more document pages each having an outer periphery, and the second interface area is located outside of the outer peripheries of each of the one of more document pages.

* * * * *